United States Patent [19]

Drever et al.

[11] Patent Number: 4,658,911
[45] Date of Patent: Apr. 21, 1987

[54] FLEXIBLE FRAMES FOR WIDE SWATH AGRICULTURAL IMPLEMENTS

[75] Inventors: Kenneth W. Drever, Piapot; Robert G. Purton, Yorkton, both of Canada

[73] Assignee: Morris Rod-Weeder Co., Ltd., Yorkton, Canada

[21] Appl. No.: 810,053

[22] Filed: Dec. 17, 1985

[51] Int. Cl.$^4$ ............................................. A01B 73/04
[52] U.S. Cl. .................................. 172/776; 172/311; 280/411 A
[58] Field of Search .............. 172/310, 311, 619, 629, 172/631, 633, 640, 657, 662, 776; 280/411 R, 411 A, 412, 413

[56] References Cited

U.S. PATENT DOCUMENTS

| | | | |
|---|---|---|---|
| 3,327,787 | 6/1967 | Adee | 172/311 |
| 4,102,404 | 7/1978 | Krammer | 172/310 |
| 4,355,689 | 10/1982 | Friggstad | 172/311 |

FOREIGN PATENT DOCUMENTS 945028  11/1948  France ..................... 172/631

*Primary Examiner*—Richard T. Stouffer
*Attorney, Agent, or Firm*—Cushman, Darby & Cushman

[57] ABSTRACT

A wide swath agricultural implement is provided with a plurality of frame sections arranged side by side with respect to travel direction and which are coupled together so that they can be folded into a narrower unit for non-operational transport and also can flex about coupling axes generally parallel to travel direction and pitch about axes normal to travel direction in order to follow the contours of undulating ground. The couplings include fore and aft links with one end of the fore link hinged to the one section which pulls the other for pivotal movement about an axis parallel to travel direction and with the other end connected to the adjacent pulled section for limited universal and swivelling movement. Preferably the fore link is of triangular configuration in plan view with the apex at the latter connection and the side opposite the apex arranged parallel to the hinge axis. One end of the aft link is hinged to the pulled section for pivotal movement about an axis parallel to and alignable with the hinge axis of the fore link while the other end of the aft link is pivotally connected to the pulling section for limited universal and swivelling movement. The aft link is connected to portions of the sections which overlap transversely of travel direction so that in operation the aft link is in tension.

5 Claims, 10 Drawing Figures

FLEXIBLE FRAMES FOR WIDE SWATH AGRICULTURAL IMPLEMENTS

FIELD OF THE INVENTION

This invention relates to improvements in flexibility for travelling machines of large span or wide swath, especially agricultural machines or implements, which not only allow most portions of the machine to follow the contours of undulating ground and thus maintain a substantially constant above-ground height but also allow the machine to be folded easily into a compact form for non-operational transport. Such machines include, for example, tillage machines, seeders or drills, chemical and fertilizer applicators, harvesters or foragers, etc.

BACKGROUND OF THE INVENTION

Ever since farm machinery or implements were developed to cover a wide swath, attempts have been made to have the machines follow the contours of the ground, which in many areas undulates to various degrees. Very early, as shown, for example, in U.S. Pat. Nos. 2,641,886, 3,321,028 and 4,133,391 machines were proposed with hinged side-by-side frame sections to follow ground contours and also allow folding for transport. These machines, though they could only flex about their hinge axes generally parallel to the direction or path of travel, proved to be a big improvement over rigid frame machines. Hinged sectional-frame tillage implements also have been proposed to allow frames to flex about at least two angularly-divergent axes by having the several hinge axes arranged at various different angles relative to travel direction. This is shown, for example, in U.S. Pat. No. 3,487,882. This implement, however, cannot fold compactly. Further, even though that implement provides axes of flexibility at different angles, very often an individual flex axis will not match the contour of the ground.

Other highly flexible machines have been proposed which use a wide span hitch or drawbar to tow many small identical modular operational units, e.g., drills, as shown, for example, in U.S. Pat. No. 4,109,928. In that machine, each independent unit follows the ground contours of a narrow portion of the entire swath. This arrangement cannot be folded for transport, however, and requires an expensive hitch or drawbar which must be built with a strength comparable to that of the towed tillage units. In contrast to the machine of U.S. Pat. No. 4,109,928, cost efficient tillage equipment mounts tillage tools on a hitch type structure in which the frame serves a dual purpose.

Still other machines have been proposed that improve on hitches which tow identical operational units that independently follow ground contours. For example, U.S. Pat. No. 4,191,260 discloses a tow hitch with which it is possible to fold the individual operational units for transport. However, this structure is very complicated and, accordingly, expensive to build.

There are still other flexible improvements in wide-swath machines, such as those shown in U.S. Pat. Nos. 4,355,689 and 4,105,077, wherein the machines flex about their folding axes. While these machines have a high degree of flexibility and are less expensive to build than other machines of comparable flexibility, they allow flexing only about hinge axes parallel to travel direction and the folding mechanisms are very complex, particularly that disclosed in U.S. Pat. No. 4,355,689. Such complex folding mechanisms are not only expensive but also not entirely trouble free.

SUMMARY OF THE INVENTION

Accordingly, it is an object of this invention to provide a frame for wide swath travelling agricultural implements which not only has hinged wing sections that can be folded simply and easily for transport in compact form and also provides for frame flexibility about the hinge axes but also provides for frame flexibility of the sections about axes generally normal to the hinge axes, i.e. transverse to the path of travel.

It is another object of this invention to provide such a frame of improved flexibility that is inexpensive to build, strong and of simple uncomplicated construction.

The foregoing objects are accomplished by connecting adjacent sections, i.e. a wing and a main section of two wing sections, by fore and aft links. The fore or forward link, at one end, is hinged to the inboard or main section for pivotal movement about a first axis parallel to the path of travel, and, at the other end, is connected to the outboard or wing section for limited universal and swivelling movement. The aft link, at one end, is hinged to the outboard section for pivotal movement about an axis aligned with the first axis, when the sections are in coplanar relation, and, at the other end, is connected for limited universal and swivelling movement to the inboard section at a location thereon disposed outboard of the connection of the one end of the aft link, i.e. adjacent rear portions of the sections transversely overlap each other. Thus, the aft rear link is in tension during operation of the implement.

Preferably the fore link is generally triangular in plan view with one side arranged parallel to the hinge axis, with the hinge extended along that axis, and with the apex opposite the one side disposed adjacent the connection to the outboard section. Thus, the fore link is strengthened to resist the rearward directed bending moment about the hinge axis occasioned by pulling the outboard section by the inboard section, i.e. by transferring the forward thrust of the latter to the outboard section.

Other objects and advantages of the invention will be evident from the following description and accompanying drawings.

DETAILED DESCRIPTION OF THE INVENTION

Figure 1:
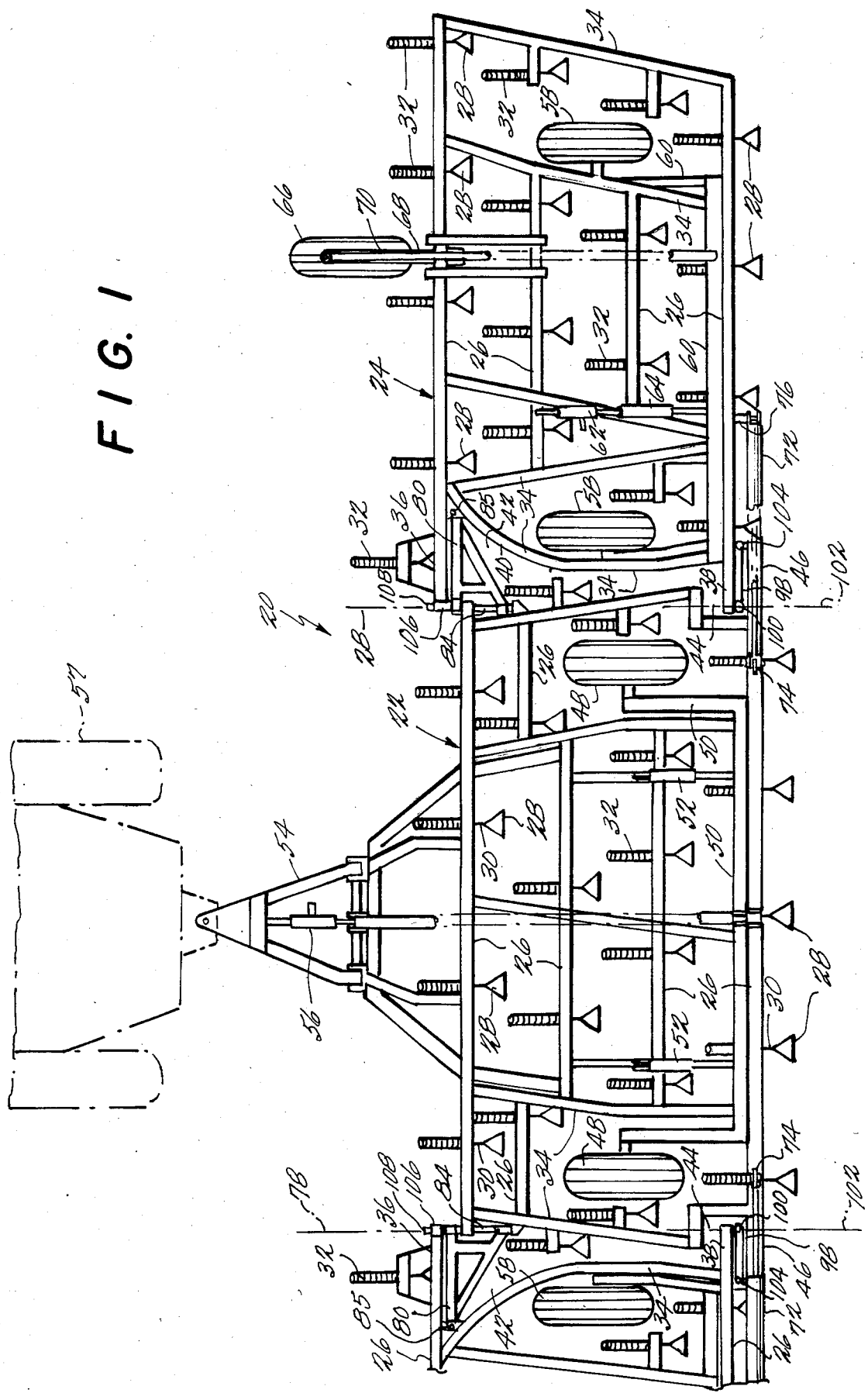
FIG. 1 is a plan view of a portion of a wide swath agricultural implement embodying this invention.
Figure 2:
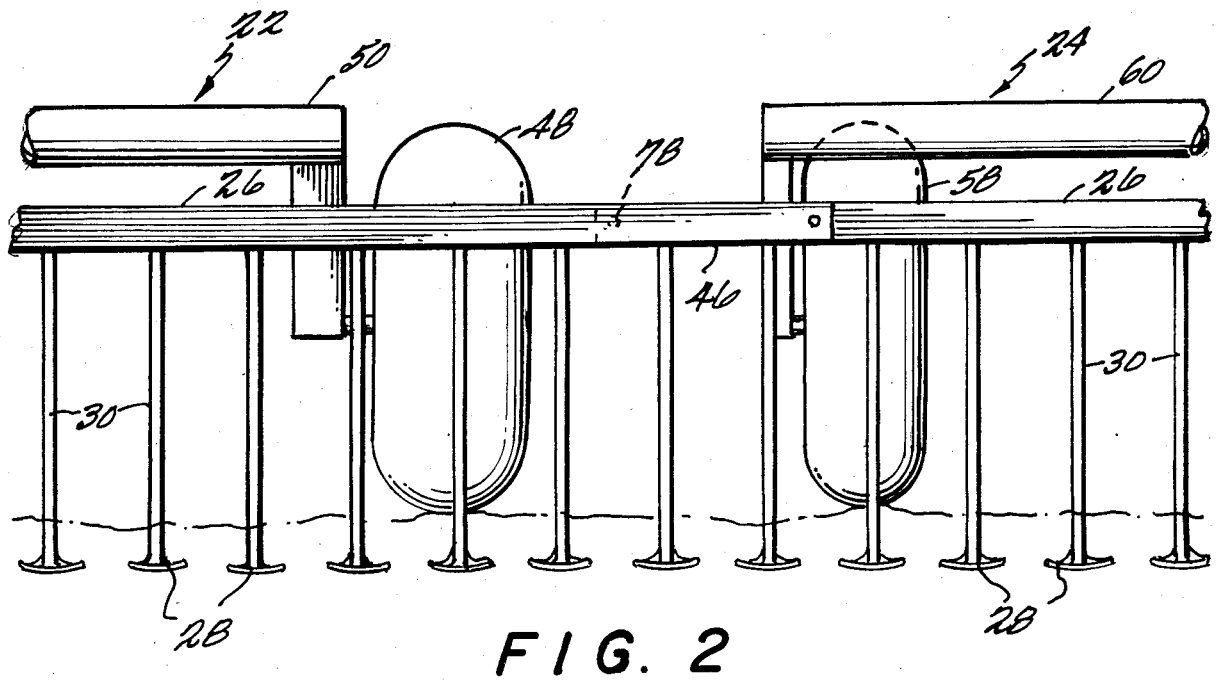
FIG. 2 is a schematic fragmentary enlarged rear elevational view of a portion of the implement shown in FIG. 1 resting on level ground.
Figure 3:
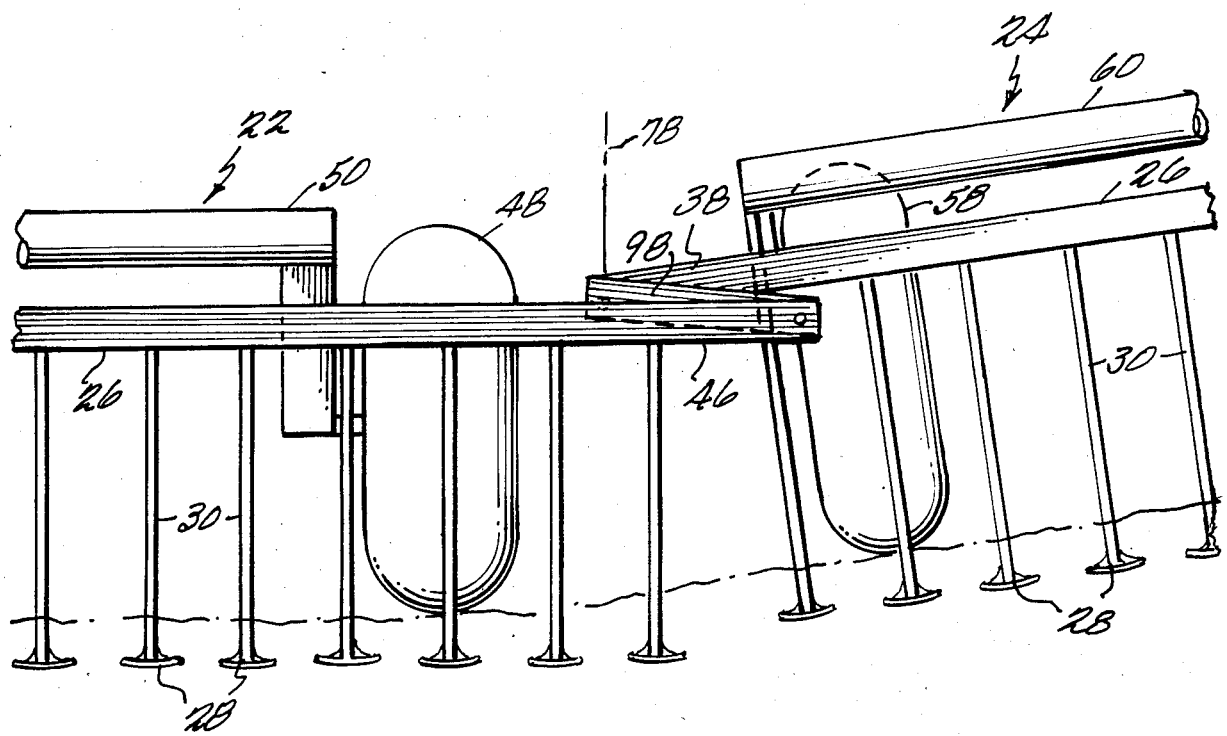
FIG. 3 is a view corresponding to FIG. 2 showing the main frame section of the implement resting on level ground and the wing frame section resting on ground that is transversely upwardly inclined.

Referring now to FIG. 1 of the drawings, there is shown a portion of a typical wide swath cultivator 20 embodying this invention. The cultivator 20 has a frame made up of a plurality of sections arranged side-by-side and coupled together for folding the implement into a compact unit for transport and also for permitting relative flexing between adjacent frame sections about axes parallel to the direction or path of travel and also substantially normal thereto to enable each section to conform more closely to the contours of undulating or uneven ground in order to maintain a substantially constant above ground height. Typically the cultivator 20 may have a central main frame section 22 and a wing frame section 24 on each side of the main section. The cultivator 20 also may have outboard wing frame sections (not shown) coupled to the outboard sides of the wing sections 24 in the same manner as the latter are coupled to the main section 22.

The several frame sections 22 and 24 conventionally are generally rectangular in plan view and formed of transverse bars 26, carrying ground-engaging tools, for example, cultivator sweeps 28 having shanks 30 fastened to spring-trips 32, and generally longitudinal, i.e. parallel to travel direction, bars 34 of any conventional cross-section. For reasons later evident, the fore and aft transverse bars 26 of each wing section 24 are extended inboard, as at 36 and 38, respectively, of the corresponding inboard side bar 34 connecting the fore and aft bars and such side bar may be convexly curved at its forward portion, as shown at 40, or otherwise shaped to provide a forward pocket 42, in plan view, between each wing section and the main section 22. Further, the rearward portion of each side bar 34 of the main section may be shaped, as shown, to provide a rear pocket 44 for reception of the extension 38 of the aft transverse bar 26 of the adjacent wing section 24. For reasons later explained, the aft transverse bar 26 of the main section 22 is extended outboard at each end, as at 46, to overlap the extension 38 of the adjacent wing section 24.

The main frame section 22 is supported by a pair of transversely-spaced ground-engaging wheels 48 mounted to the section by conventional structure 50 movable by linear actuators 52, i.e. hydraulic cylinders, to adjust the above-ground height of the main frame section. The main frame section 22 also is provided with an A-frame hitch 54 connected to the main section for pivotal movement about a transverse horizontal axis. The vertical angular relation between the hitch 54 and the main frame section 22 is adjustable by a ratchet jack 56 pivotally connected to the hitch and an aft portion of the main frame section 22 to maintain the latter substantially parallel to the ground irrespective of the height of the connection between the hitch and a prime mover 57. Similarly the wing frame sections 24 are each provided with a pair of transversely-spaced ground-engaging wheels 58 mounted to the section by conventional structure 60 movable by a ratchet jack 62 and a linear actuator 64, i.e. a hydraulic cylinder, to adjust the above-ground height of the wheels 58. Each wing section 24 also is provided with another wheel 66 spaced longitudinally, i.e. along the travel path, from the wheels 58, so that the wing section pitches to follow the contours of the ground. The wheel 66 also is mounted to the wing section by conventional structure 68 which is movable by a ratchet jack 70 to adjust above-ground height of the wing frame 24 while maintaining it, in conjunction with the wheels 58, substantially parallel to the ground therebeneath.

Conventional wing lifts of many types can be used for folding the wing sections 24 for transport. For example, linear actuators 72, e.g. hydraulic cylinders, may be pivotally connected to brackets 74, 76 on top of the main 22 and wing sections 24 respectively, to pull the latter to a nearly upright position as shown, for example, in the copending application of Cecil Machnee, Ser. No. 591,785, filed March 21, 1984.

Figure 9:
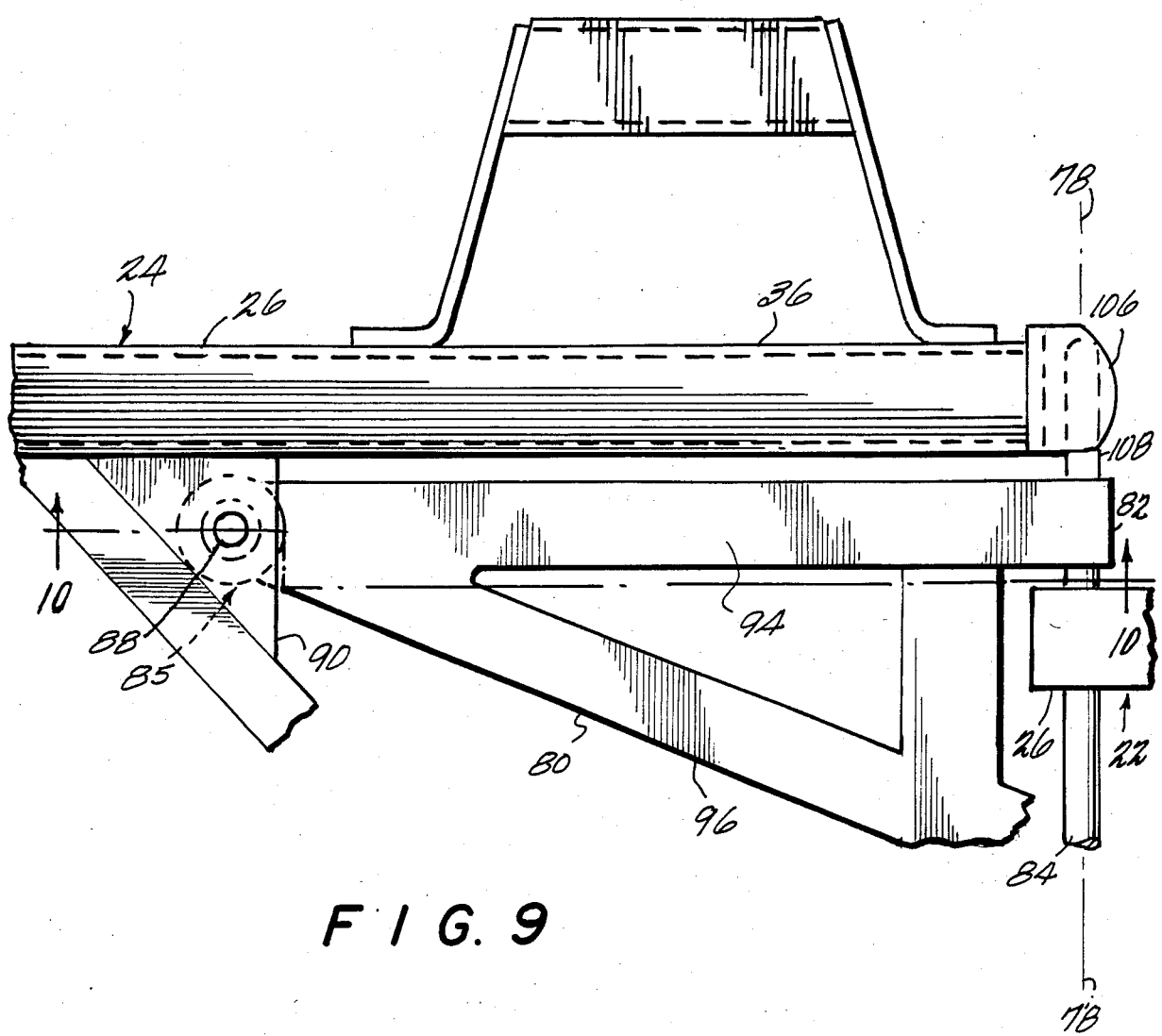
FIG. 9 is an enlarged fragmentary plan view of a portion of FIG. 1.
Figure 10:
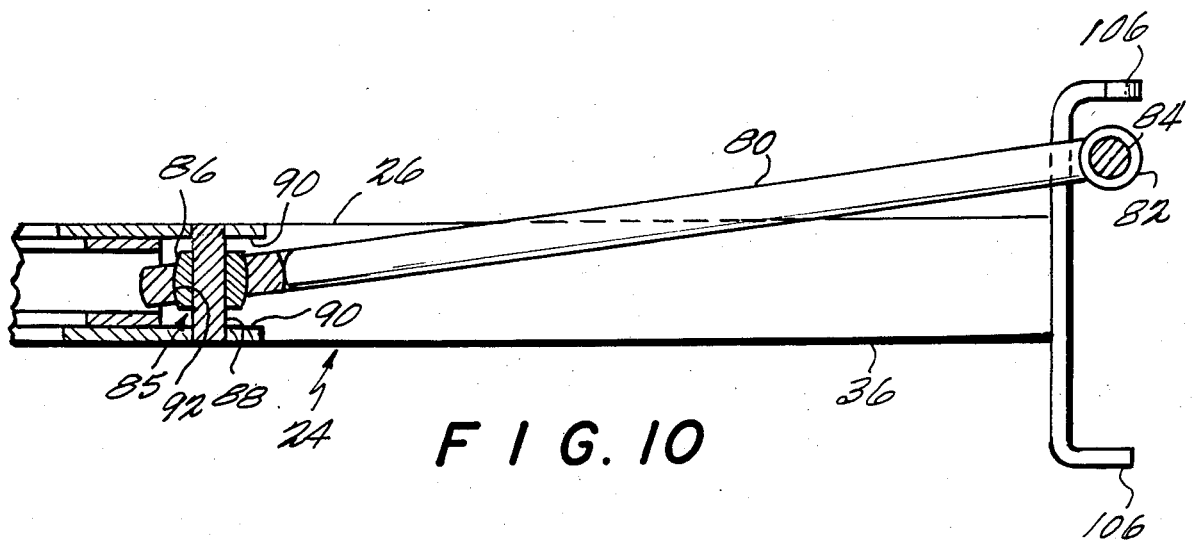
FIG. 10 is a schematic sectional view taken on line 10—10 of FIG. 9.

As described above, the wing sections 24 are coupled to the main section 22 so that they can flex relative thereto about axes 78 generally parallel to the path of travel as well as fold upward about those axes for transport, e.g. travel along a relatively narrow road instead of a field. Further, the wing sections 24 are coupled to the main section 22 so that they can translate vertically, to a limited extent, relative to the main frame section and also pitch, i.e. pivot about transverse axes, to a limited degree relative to the main frame section. For this purpose, forward portions of the main 22 and each wing section 24 are connected by a transverse fore link 80, located in the pocket 42 and preferably generally triangular in plan view, as shown in greater detail in FIGS. 5, 6, 9 and 10. An apex of the link 80 is connected to the wing frame 24 while the side opposite the apex is hinged to the main frame 22 for pivotal movement about an axis 78 generally parallel to the path of travel of the implement 20. For example, the link 80 has spaced bearing portions 82 journalled on a rod 84 supported on the side of the main section 22 (FIGS. 9 and 10). The apex of the link 80 is provided with a ball and socket connection 85 to the wing section 24 so as to have limited universal as well as swivelling movement relative to the latter. For example, the connection 85 may include a ball 86 fastened by an upright pin 88 to vertically-spaced bracket plates 90 on the wing section 24 and a partial socket 92 on the apex of the link 80 embracing the ball so that the link has limited universal movement about axes transverse to the axis of the pin 88 as well as limited swivelling movement about an axis normal to the hinge axis 78 and intersecting the center of the ball. It will be seen that in operation the forward thrust of the main section 22 is transferred to each wing section 24 by the corresponding forward link 80 and that, as a result, a large rearward bending moment is applied to each link 80. The moment is counteracted, however, by the strength of the link 80 occasioned by its triangular configuration, wherein the forward side portion 94 is in tension and the rearward side portion 96 in compression due to the extended connection at the hinge axis 78.

The rear portions of the main 22 and each wing section 24 also are coupled by an aft link 98 having one end pivotally or hingedly connected, as at 100, to the inboard end of the extended portion 38 of the rear transverse bar 26 of the wing section for pivotal movement about an axis 102 coaxial with the hinge axis 78 of the fore link 80 when the corresponding wing and main sections are in a substantially coplanar relation. The other end of each aft link 98 is provided with a ball and socket connection 104 to the end of the extension 46 of the aft transverse bar 26 of the main section 22, such connection being essentially the same as the ball and socket connector 85 connecting the apex of each forward link 80 to the corresponding wing section 24. Because of the transversely overlapping relation of the aft bars 26 of the main 22 and each wing section 24, it will be seen that during operation of the implement the aft links 98 are in tension.

Figure 4:
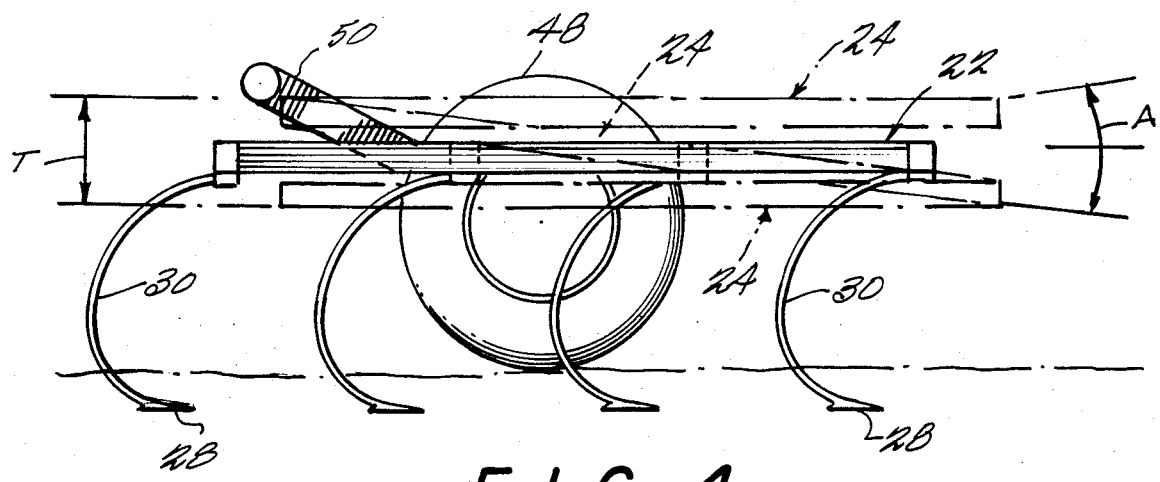
FIG. 4 is a schematic fragmentary longitudinal sectional view of the implement shown in FIG. 1 showing in dotted lines the extent of vertical translation and of pitch of a wing frame section relative to the main frame section.
Figure 5:
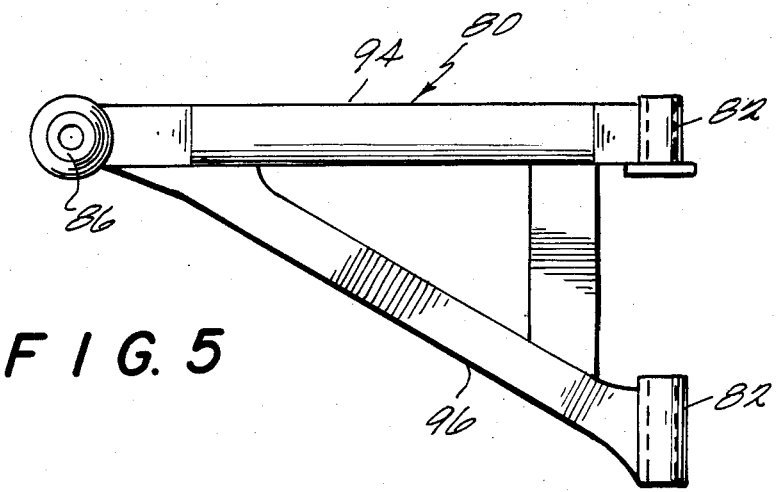
FIGS. 5 and 6 are enlarged plan and side views, respectively, of one of the fore links shown in FIG. 1.
Figure 6:
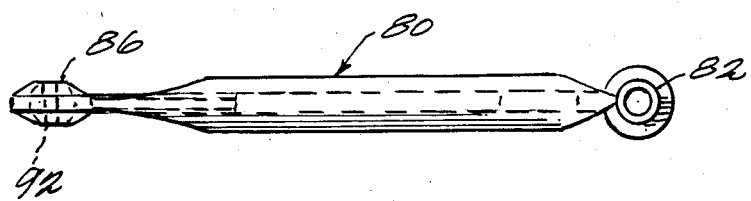
Figure 7:
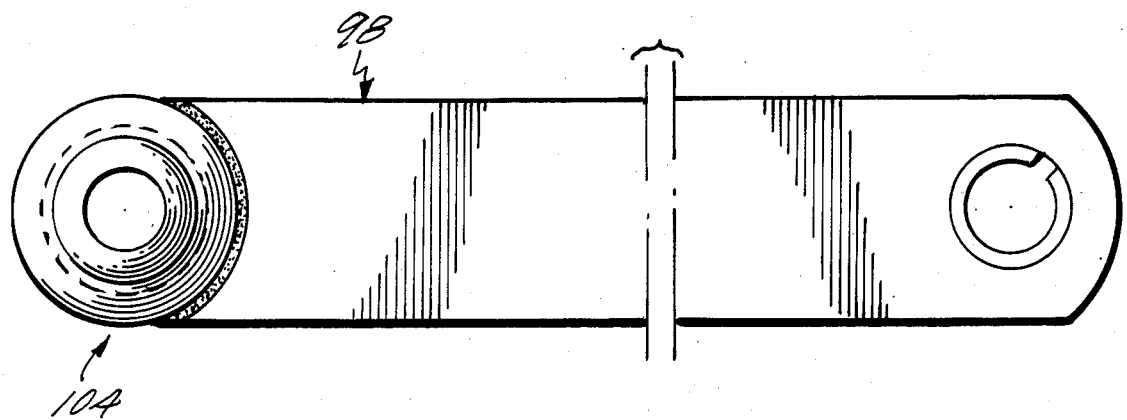
FIGS. 7 and 8 are enlarged plan and side views, respectively, of one of the aft links shown in FIG. 1.
Figure 8:
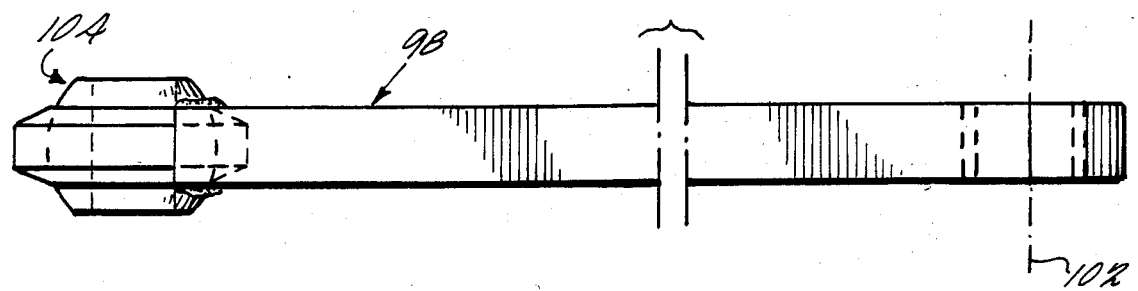

It further will be seen that the general coaxial relation of the hinge 78, 102 axes of the fore and aft links 80, 98 permits each wing section 24 to flex about those axes to follow side slope, uphill or downhill, ground contours relative to the main section 22 as well as to be folded upward so that the implement has a much narrower width for transport. It also will be seen that the links 80, 98 permit vertical translation, up or down, of each wing section 24 relative to the main section 22 to follow certain ground contours, as shown at T in FIG. 4. Further the links 80, 98 permit each wing section 24 to pitch about various transverse axes, relative to the main section 24, to follow forward slope, uphill or downhill, ground contours, as shown by the angular displacement A in FIG. 4.

The wing sections 24 are capable of such pitching because the connections of the fore and aft links 80, 98, respectively, to each wing section 24 and to the main section 27 not only permit vertical translational displacement and angular displacement, about longitudinal axes of each wing section relative to the main section but also enables swivelling of such connections. Such swivelling is necessary to allow pitching of each wing section 24 relative to the main section 22. It also will be seen that such pitching causes fore and aft displacement of the connections 85, 104, respectively, relative to the main section 22, thus imposing bending moments on the links 80, 98 about upright axes. Such displacements and moments are accommodated by making the aft links 98 slightly flexible in fore and aft directions and also by limiting such displacements.

For the latter purpose and also to prevent undue misalignment of the fore and aft hinge axes 78, 102 of the links 80, 98 so the wing sections 24 can be folded upward readily, interengaging stop means are provided on the main section 22 and each wing section 24. Such stop means may take many forms but is illustrated as vertically-spaced projections 106 on the forward corner of each wing section 24 embracing a forward extension 108 of the corresponding hinge rod 84, as shown best in FIGS. 9 and 10. It will be seen that such stops 106 limit not only vertical translational displacement of each wing section 24 relative to the main section 22, but also angular pivoting of each fore link 80 about a longitudinal axis through the connection 85 relative to the corresponding wing section 24 to thus effectively limit the extent of pitching of such wing section.

As stated above, additional wing sections (not shown) can be coupled to the outboard sides of the wing sections 24 in the same way the latter are coupled to the main section 22, of course by suitably constructing the adjacent sides of such additional wing sections and the wing sections 24. Such additional wing sections can also be folded upward for transport in the same manner as the wing sections 24, as shown, for example in the aforesaid copending application Ser. No. 591,785, filed March 21, 1984.

It thus will be seen that the objects and advantages of this invention have been fully and effectively achieved. It will be realized, however, that the foregoing specific embodiment has been disclosed only for the purposes of illustrating the principles of this invention and is susceptible of modification without departing from such principles. Accordingly, the invention includes all embodiments encompassed within the spirit and scope of the following claims.

We claim:

1. A wide swath agricultural implement defining an intended forward path of travel and adapted to have substantially all frame sections thereof follow ground contours and maintain a substantially constant height above ground, comprising:

at least first and second frame sections arranged side-by-side transversely of said path, said first section having at least two ground engaging support wheels spaced transversely of said path and said second section having at least two ground engaging support wheels spaced along said path of travel; and link means coupling said sections together for transferring forward thrust of said first section to said second section, for limited vertical translational displacement of said second section relative to said first section, for limited angular displacement of said second section relative to said first section substantially above at least one first axis generally normal to said path and for angular displacement of said second section relative to said first section about a second axis generally parallel to said path, said angular displacement about said second axis being sufficient to enable said second section to be raised to a folded transport position substantially or fully supported on said first section, said link means comprising:

first link means;

first hinge means connecting said first link means to a forward side portion of said first section for pivotal movement about said second axis;

means connecting said first link means to a forward side portion of said second section opposed to said forward side portion of said first section for limited universal and swivelling movement;

second link means;

second hinge means connecting said second link means to a rear side portion of said second section for pivotal movement about a third axis parallel to and alignable with said second axis; and means connecting said second link means to a rear side portion of said first section which transversely overlaps said second section for limited universal and swivelling movement, said connecting means for said second link means being located transversely outboard of said second hinge means, whereby during operation of said implement said second link means is in tension.

2. The structure defined in claim 1 wherein the first link means is generally triangular with an apex at the corresponding connecting means thereof and the side opposite said apex generally parallel to the second axis, said first hinge means being extended along said second axis.

3. The structure defined in claim 1 in which the first section is a main section adapted to be towed by a prime mover.

4. The structure defined in claim 1 in which the second section has at least three wheels, two being spaced in alignment transversely of the path.

5. The structure defined in claim 1 including interengaging stop means on the frame sections to limit the relative translational and angular displacement therebetween about the at least one first axis.

* * * * *